United States Patent [19]
Buell et al.

[11] 4,070,674
[45] Jan. 24, 1978

[54] DOPPLER HEADING ATTITUDE REFERENCE SYSTEM

[75] Inventors: Heinz Buell, Mount Kisco, N.Y.; John M. Fiore, Elizabeth, N.J.

[73] Assignee: The Singer Company, Little Falls, N.J.

[21] Appl. No.: 732,574

[22] Filed: Oct. 15, 1976

Related U.S. Application Data

[63] Continuation-in-part of Ser. No. 407,120, Oct. 17, 1973, abandoned.

[51] Int. Cl.² .................... G01C 21/18; G01S 9/44
[52] U.S. Cl. ............................. 343/9; 364/453
[58] Field of Search ................. 343/9; 235/150.25

[56] References Cited

U.S. PATENT DOCUMENTS

| | | | |
|---|---|---|---|
| 3,131,390 | 4/1964 | Condie et al. | 343/9 X |
| 3,167,763 | 1/1965 | Barkalow et al. | 343/9 |
| 3,414,899 | 12/1968 | Buell | 343/9 |
| 3,430,239 | 2/1969 | Buell et al. | 343/9 |
| 3,432,856 | 3/1969 | Buell et al. | 235/150.25 |

*Primary Examiner*—Malcolm F. Hubler
*Attorney, Agent, or Firm*—T. W. Kennedy

[57] ABSTRACT

A doppler radar/inertial system is provided for producing navigational and fire control information for an aircraft, and which includes means for developing vertical reference signals accurately at one location and for then transferring the signals to a second location without incurring errors due to aircraft flexure. The system includes high quality accelerometers and gyroscopes mounted at one location in the aircraft for developing accurate vertical reference signals; and a high quality accelerometer and low cost gyroscope at a second location where accurate vertical reference information is required. The system includes circuitry for comparing the output of the high quality accelerometer at the second location with the accelerometer outputs at the first location, the difference of which is a function of the error in the vertical reference at the second location, as indicated by the low cost gyroscope. The system includes further circuitry which is responsive to the output differential of the accelerometers to correct the error in the reading of the low cost gyroscope at the second location.

4 Claims, 7 Drawing Figures

PRIOR ART

DOPPLER HEADING ATTITUDE REFERENCE SYSTEM

This invention is a continuation-in-part of application Ser. No. 407,120 filed Oct. 17, 1973, now abandoned.

BACKGROUND OF THE INVENTION

The invention is concerned with an improved and relatively inexpensive system for use on an aircraft, or the like, and which employs a combination of a doppler radar system and an inertial system to provide navigational and fire control information for the aircraft. Navigational systems employing combinations of inertial elements and doppler radar units are known in the art. Such systems are described, for example, in U.S. Pat. Nos. 2,914,763 — Greenwood, 3,028,592 — Parr, 3,430,238 — Buell et al. and 3,430,239 — Buell et al.

U.S. Patent 3,430,238, for example, describes a high quality inertial heading reference unit mounted on a doppler antenna to measure vertical error of the antenna stabilizer. The derived error signal is then used in the system to impart a compensation to the vertical gyroscope which supplies pitch and roll data to the doppler antenna. It is to be noted that any air frame flexure or bending between the vertical gyroscope and the antenna produces an uncompensated error in the system. The system described in U.S. Pat. No. 3,430,239 attempts to eliminate the effects of air frame flexure by using a two gimbal inertial quality vertical gyroscope in place of the vertical gyroscope described in the system of U.S. Pat. No. 3,430,238. In the system U.S. Pat. 3,430,239, doppler radar velocity signals are used to stabilize the vertical gyroscope to compensate for vehicle motion over the earth. The vertical gryoscope may be mounted anywhere in the aircraft, and it still provides extremely accurate pitch and roll information at the location at which it is mounted.

The system of the present invention is also capable of providing the accurate pitch and roll information anywhere in the aircraft, but without the need for the expensive high quality vertical gyroscope used in the system described in U.S. Pat. No. 3,420,239. The system of the invention provides accurate vertical information anywhere in the aircraft, and at a cost only slightly greater than the uncompensated system described in the U.S. Pat. No. 3,430,238.

As described in the U.S. Pat. No. 3,420,239, doppler and inertial systems have complementary advantages, in that the doppler system has good response to low frequency fluctuations of input data, while inertial systems have good response to high frequency fluctuations of input data. One factor affecting the accuracy of both systems is the need for accurate knowledge of the vertical direction. This knowledge is required in doppler systems in order to determine the angular position of the transmitted beams, although recent developments in the art of linear array antennas have relaxed the requirements to some extent. The accurate knowledge of the vertical direction is a stringent requirement in the inertial system because the platform must be exactly horizontal if the accelerometers are to interpret the acceleration of gravity purely as vertical acceleration.

Doppler inertial navigation systems are usually expected to provide not only accurate heading and velocity data for navigational purposes, but also an accurate vertical reference. The expression "vertical reference", when used in the following specification, is intended to refer to the problem of accurately determining the orientation in the aircraft at a particular location which represents an exact vertical vector. Such vertical reference data, in addition to the requirements described above, is often required for the accurate operation of auxiliary equipment such as aerial cameras, terrain following systems, bomb sights, and fire control apparatus.

The embodiment of the attitude reference system to be described herein, for purposes of explanation, will be considered as providing fire control signals for a swivelling gun station in an aircraft. It has been found that if the swivelling gun station requiring the accurate vertical reference is located in a position remote from the navigational system, then the vertical data supplied by the navigation system does not accurately represent the vertical direction at the position of the apparatus. This is because of factors such as physical flexure and deformation of the air frame between the location of the navigation system and the swivelling gun station.

As mentioned above, the aforesaid problem is overcome in the system of U.S. Pat. No. 3,430,239 by the provision of a high quality vertical reference unit at the location, for example, of the swivelling gun station. The system of the present invention, however, permits the elimination of the high quality, expensive vertical reference unit, and thereby provides a major cost reduction in the overall system, while yet retaining a high degree of accuracy in the overall control.

DETAILED DESCRIPTION OF THE ILLUSTRATED EMBODIMENT

Figure 1:
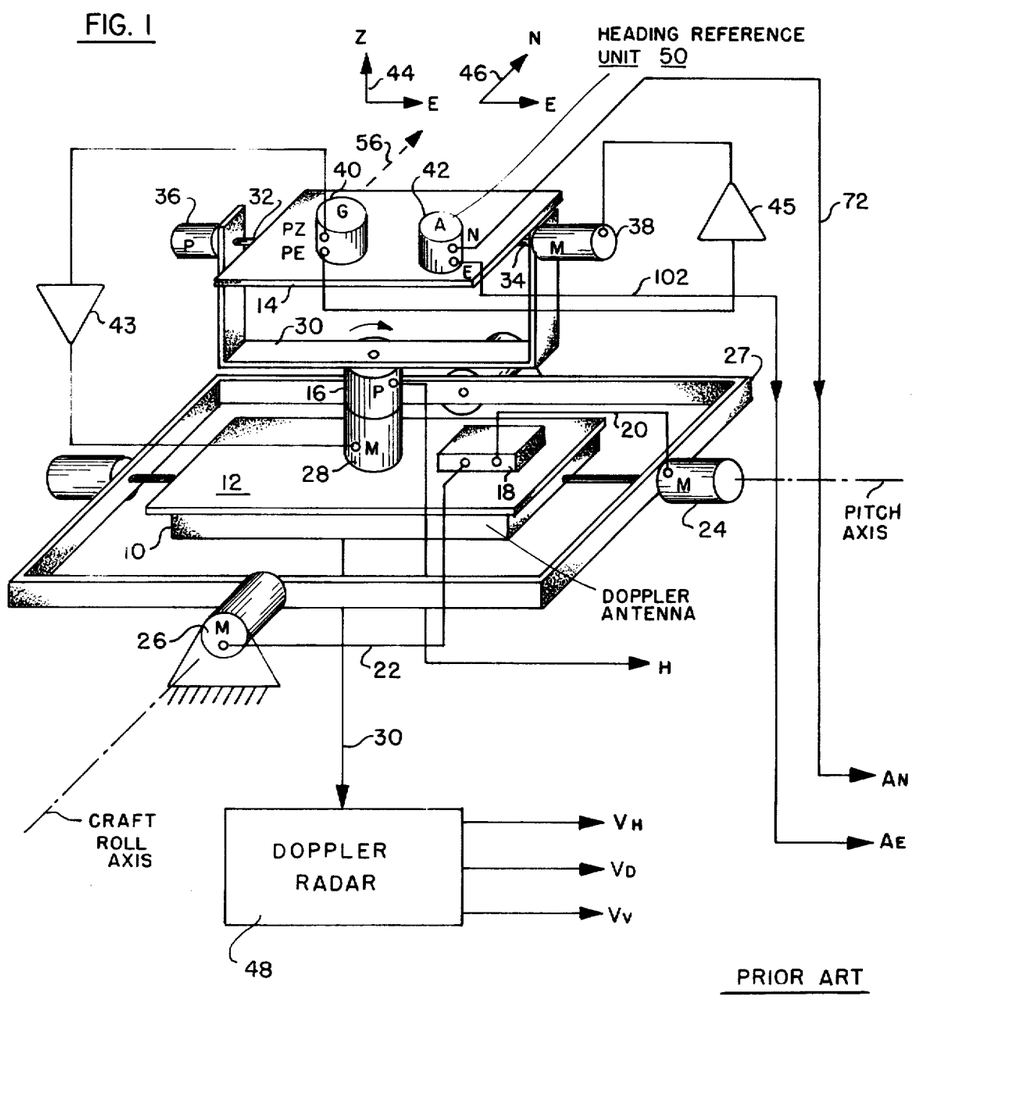
FIG. 1 is a schematic diagram of a heading reference unit and combined doppler radar system which may be mounted in the aircraft as a component of the system of the present invention.

In the schematic representation of FIG. 1, a doppler radar antenna 10 is mounted upon a horizontally stabilized platform 12. A reference table 14 for the inertial guidance elements of the system is mounted on the antenna platform 12 by means of a two-gimbal arrangement. The system, including the inertial elements mounted on the inertial reference table 14, is effective to cause the table 14 to be continuously gyrocompassed in azimuth to maintain an alignment towards North, while the antenna platform 12 remains aligned with the axis of the aircraft. A pick-up transducer 16 continuously measures the angle between the platform 12 and table 14. The resultant heading signal H is an accurate analog representation of the heading of the aircraft in relation to North.

The antenna platform 12 is maintained in a horizontally stabilized position by means of vertical reference signals which may be obtained from a level detector device 18 of conventional construction. These levelling signals are available through connections 20 and 22 to servo motors 24 and 26. It is important for the antenna platform to be stabilized in a horizontal position with extreme accuracy in order that the doppler radar signals generated by the system likewise may be accurate. The servo motors 24 and 26 form part of a two gimbal mounting for the platform 12, which includes a gimbal ring 27. The shafts of the motors 24 and 26 are respectively parallel to the pitch and roll axes of the aircraft.

The mounting which mounts the reference table 14 upon the horizontally stabilized antenna platform 12 includes an azimuth positioning motor 28 and the pick up device 16, the stators of which are attached to one another and mounted on the stabilized platform 12. The rotors of the motor 28 and pick-up 16 are both mounted to a common shaft which supports a gimbal ring 30. The motor 28 is normally caused to rotate the gimbal ring 30 in azimuth, so as to maintain the position of the gimbal ring 30 in a plane generally perpendicular to the North direction.

Pivotally mounted on the gimbal ring 30 are two coaxial shafts 32 and 34 which directly support the reference table 14. The shaft 32 may form the rotor of a synchro-pick-up device 36, the stator of which is rigidly mounted to the gimbal ring 30. The shaft 34, on the other hand, is the rotor shaft of a motor 38, the stator of which is rigidly connected to the gimbal ring 30. The common axis of the shafts 32 and 34 is generally maintained in an East-West alignment, and the motor 38 is usually energized and needed to rotate the shaft 34 and the reference table 14 in order to maintain the reference table 14 horizontal with respect to the East axis. Since no third gimbal is provided for the reference table 14, no final correction of level of the reference table 14 for deviations about the North axis is available, this correction being made in the electronic system, as will be described.

The inertial sensing devices attached to and supported upon the reference table 14 includes a two-axis, two degree of freedom gyroscope 40, and a two-axis accelerometer 42. The gyroscope 40 is responsive to rotational displacements about a vertical axis, and to rotational displacements about an East axis, as indicated symbolically by the vectors 44. The accelerometer 42 is responsive to accelerations along the North axis, and to accelerations along the East axis, as symbolically illustrated by the vectors at 46.

The accelerometer 42 provides signals at output connections for North accelerations and East accelerations respectively indicated in the drawings as $A_N$ and $A_E$. The gyroscope 40 provides pick-up output signals for rotational displacement errors about the azimuth axis and about the East axis respectively indicated as PZ and PE. Torquing input signals are applied to the gyroscope 40 for azimuth axis and East axis rotations at the respective input terminals. The azimuth output signal is applied through an amplifier 43 to control the table azimuth positioning motor 28. The East axis gyroscope output signal is applied through an amplifier 45 to control the table East axis positioning motor 38.

The doppler radar portion of the system is indicated schematically by the box 48, and it is connected to the antenna 10. This radar set may correspond to radar sets which have been used in prior art systems. It may, for example, employ three or more radar beams, with two beams aimed downwardly ahead of the aricraft on each side of it, and with one or two beams directed downwardly to the rear of the aircraft, on one or both sides. Comparisons of the frequencies of the transmitted signals and the echo signals reflected back from the ground for the various beams provides an accurate indication of aircraft velocity and direction particularly when averaged out over a period of time to compensate for irregularities in the terrain.

A complete description of a suitable radar set for use in the system of the present invention may be found in U.S. Pat. No. 3,028,592 referred to above. The doppler radar set 48 is capable of providing output signals which are an accurate indication of the velocity $V_H$ of the aircraft along the aircraft heading direction, the vertical velocity of the aircraft $V_V$ as well as cross heading velocity information, designated the doppler velocity $V_D$. A more complete description of the heading reference unit and combined doppler radar system shown in FIG. 1 may be found in U.S. Pat. No. 3,430,239 referred to above.

Figure 2:
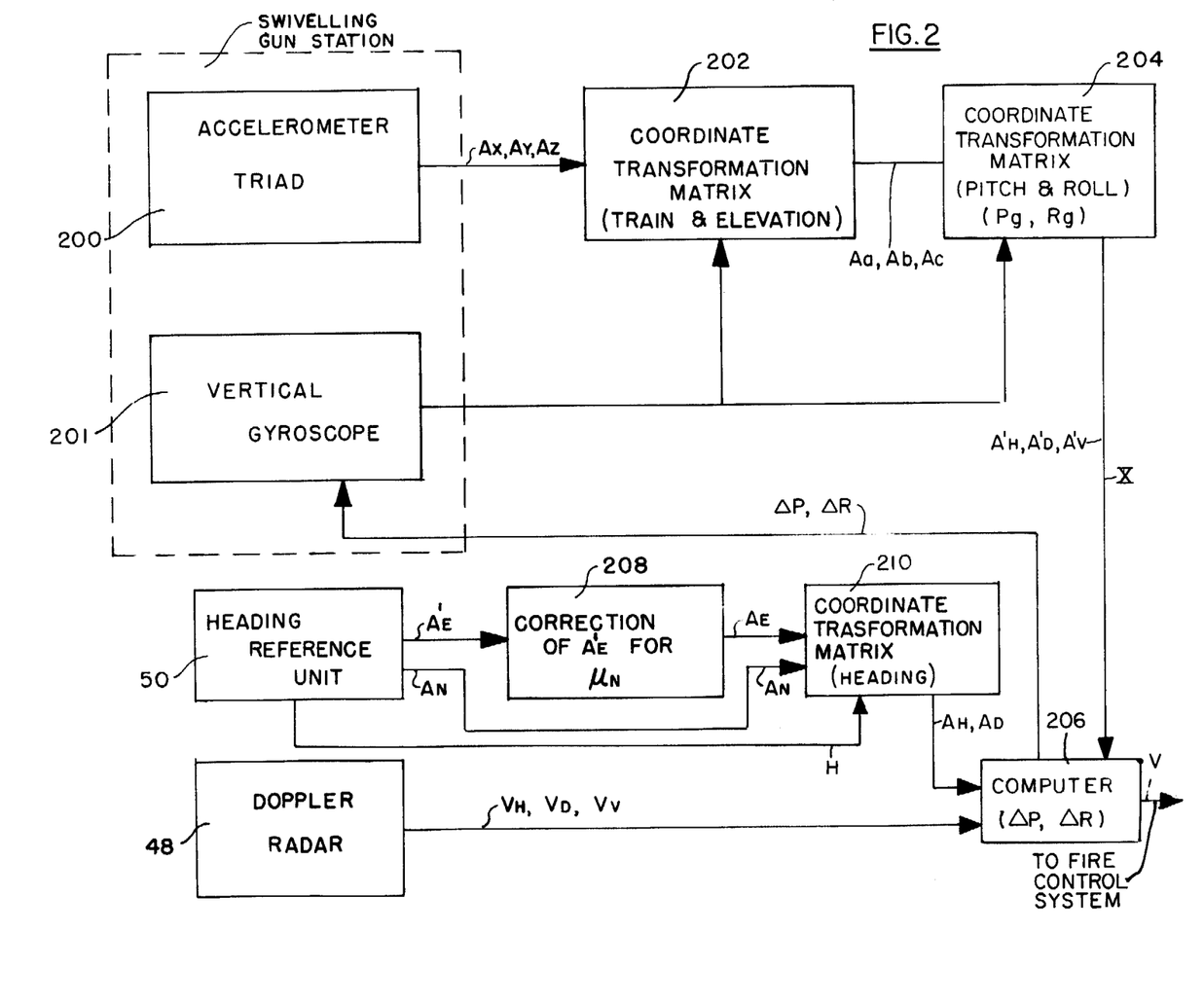
FIG. 2 is a block diagram of a system incorporating the concepts of the invention.

In the practice of the present invention, acceleration signals $A_X$, $A_Y$, and $A_Z$ are derived from the usual accelerometer triad located at the swivelling gun station, as represented by the block 200 of FIG. 2. These are the accelerations along the gun frame axes X, Y and Z. In the system of FIG. 2 pitch and roll errors [Pg] and [Rg] of the standard low cost vertical gyroscope 201 normally located at the swivelling gun station are corrected to an acceptable value by using the accelerometer matching technique of the invention. The only requirement is that that accelerometers 200 at the swivelling gun station are of sufficiently high quality so as to exhibit the accuracy required in the practice of the invention. The outputs $A_X$, $A_Y$, and $A_Z$ of the accelerometers 200 at the swivelling gun station, and the outputs $A_N$, $A_E$ of the accelerometers on the heading reference unit 50 are used to compute the required correction for the vertical gyroscope in the swivelling gun station. The outputs $A_N$, and $A_E$, are accelerations along the north east axes.

The function of the low cost vertical gyroscope 201 at the swivelling gun station in the system of FIG. 2 is to provide accurate pitch and roll information at the swivelling gun station. This is so that doppler velocity information from the doppler radar unit 48 can be accurately transformed from horizontal to swivelling gun station corrdinates in the presence of air frame flexure. If no air frame flexure were present, velocity in horizontal coordinates using an antenna stabilized in pitch and roll would be acceptable. However, when the combined doppler radar and heading reference units 48, 50 and the swivelling gun station are separated by any substantial amount, air frame flexure is such that velocity information in air frame corrdinates at the swivelling gun station is in error.

As shown in FIG. 2, the velocity information is provided in horizontal coordinates $V_H$, $V_D$ and $V_V$ by the Doppler radar system 48. The outputs of the triad of orthogonally oriented accelerometers at the swivelling gun station 200, $A_X$, $A_Y$ and $A_Z$, are converted from gun station coordinates to the horizontal corrdinates (H. D. V) by transformations first through train and elevation in a coordinate transformation matrix 202 to produce the accelerations $A_a$, $A_b$, $A_c$ in an air frame coordinate system and then through pitch and roll in the coordinate transformation matrix 204 to provide the outputs $A'_H$, $A'_D$ and $A'_V$ in a horizontal coordinate system. In this manner, the outputs from the accelerometers at the swivelling gun station 200 are filtered and mixed with the Doppler velocity signals to provide at the output of the computer 206 the smooth velocity signal (V) required for fire control purposes. The accelerometer and Doppler mixing and smoothing may be represented by the following equation:

$$V_D (1/1+TS) + A/S (TS/1+TS) = V [1/1+TS + TS/1+TS] = V \quad (1)$$

By the system of FIG. 2, therefore, the outputs of the swivelling gun station accelerometers and the heading reference unit accelerometers are first transformed into a horizontal coordinate system (H, D, V) and then smoothed and compared. Any differences between the outputs will be the result of errors in the pitch and roll data from the vertical gyroscope 201 at the swivelling gun station which is used to transform the swivelling gun station accelerometer outputs to horizontal coordinates. The accelerometer output differences are processed in the apparatus 206 to establish the vertical gyroscope pitch and roll errors which are then used to correct the low cost gyroscope 201 in the swivelling gun station.

the accelerometer outputs at the two locations will also differ because of transient differences in aircraft acceleration at the two locations, for example, air frame flexure and rotation of the aircraft, and differences in the noise environment at the two locations. However, these differences are of a comparatively high frequency nature, and they can be filtered out since the pitch and roll error variations in the vertical gyroscope outputs at the swivelling gun station change at a relatively slow rate.

Since the horizontal reference unit described in conjunction with FIG. 1 is a true North-oriented two-gimbal platform with no stabilization about the North axis, the East accelerometer output is not a true measure of East acceleration. This is because a component of gravity is coupled into the output of the East accelerometer, as a result of the off-verticality about the North axis. As described in the U.S. Pat. No. 3,430,239, the vertical error about the North axis is measured in a Doppler-inertial loop, and the East accelerometer output is corrected for this error, the correction circuitry being represented by the block 208, a complete description of the circuitry being contained in the patent.

The transformation of the accelerometer outputs from the swivelling gun station into horizontal coordinates is given by:

$$\begin{vmatrix} A'_H \\ A'_D \\ A'_V \end{vmatrix} = \begin{vmatrix} \cos P & \sin R \sin P & \cos R \sin P \\ 0 & \cos R & -\sin R \\ -\sin P & \sin R \cos P & \cos R \cos P \end{vmatrix} \begin{vmatrix} Aa \\ Ab \\ Ac \end{vmatrix} \quad (2)$$

Where: Aa, Ab, and Ac are accelerometer outputs from the block 202 in air frame coordinates;

$A'_H$, $A'_D$ and $A'_V$ are outputs from the transformation matrix 204 in horizontal coordinates; and P and R are the pitch and roll angles.

The transformation from gun station coordinates through the train and elevation angles to air frame coordinates is not shown in the equation, since this simply complicates the equation and is not required for a simplified analysis of the accelerometer-matching technique of the invention.

The accelerometer outputs $A_X$, $A_Y$ and $A_Z$ from the accelerometer triad 200 at the swivelling gun station are provided as inputs to a coordinate transformation matrix 202 to be described in detail below. Here, the accelerations in a gun station coordinate system are transformed into air frame coordinates $A_A$, $A_B$ and $A_C$. These values are provided as inputs to a further coordinate transformation matrix 204, also to be described in detail below, where they are transformed into horizontal and vertical components by means of the pitch and roll outputs from the vertical gyroscope 201. The $A_E$ output of the heading reference unit is provided into a correction circuit 208 and the $A_N$ output from the heading reference 50 to additional coordinate transformation matrix 210. After correction the value $A_E$ is also provided as an input to this matrix. These are coordinates in North, East frame of reference. In the coordinate transformation matrix 210 they are transformed by heading into horizontal coordinates to be in the same frame of reference as the outputs from the coordinate transformation matrix 204. The horizontal coordinate system being referred to is one defined by the aircraft coordinates in a horizontal system, i.e., one of the axes of this coordinate system is the heading of the aircraft and the accelerations $A_H$ and $A_H$ are nominally in the direction of heading, the coordinates $A_D$ and $A_D$ in the horizontal plane perpendicular thereto and $A_V$ in vertical direction perpendicular to a plane containing the other two coordinates. This is the same coordinate system as that of the doppler radar 48. In other words, the doppler radar provides velocities in the direction of heading, across heading and vertically. The accelerations $A_H$, $A_D$ along with the acceleration $A'_H$, $A'_D$ and $A'_V$ are provided to computing apparatus 206 also having as inputs the velocities from the doppler radar. In this apparatus 206 to be described in more detail below, a velocity V to be supplied to the fire control system is developed along with error signals for correcting the vertical gyroscope 201.

The transformation of the horizontal reference unit 50 accelerometer outputs into an equivalent H, D and V coordinate system requires rotation of the North, East coordinate system through the aircraft heading H. This results in:

$$\begin{vmatrix} A_H \\ A_D \end{vmatrix} = \begin{vmatrix} \cos H & \sin H \\ -\sin H & \cos H \end{vmatrix} \begin{vmatrix} A_N \\ A_E \end{vmatrix} \quad (3)$$

Where:

$A_N$ and $A_E$ are the horizontal reference unit accelerometer outputs;

$A_H$ and $A_D$ are the outputs from a coordinate resolver 210 in the H, D and V coordinate system; and H is the heading angle.

$A_E$ in Equation (3) includes the correction from the block 208 for the horizontal reference unit vertical error about the North axis.

Figure 3:
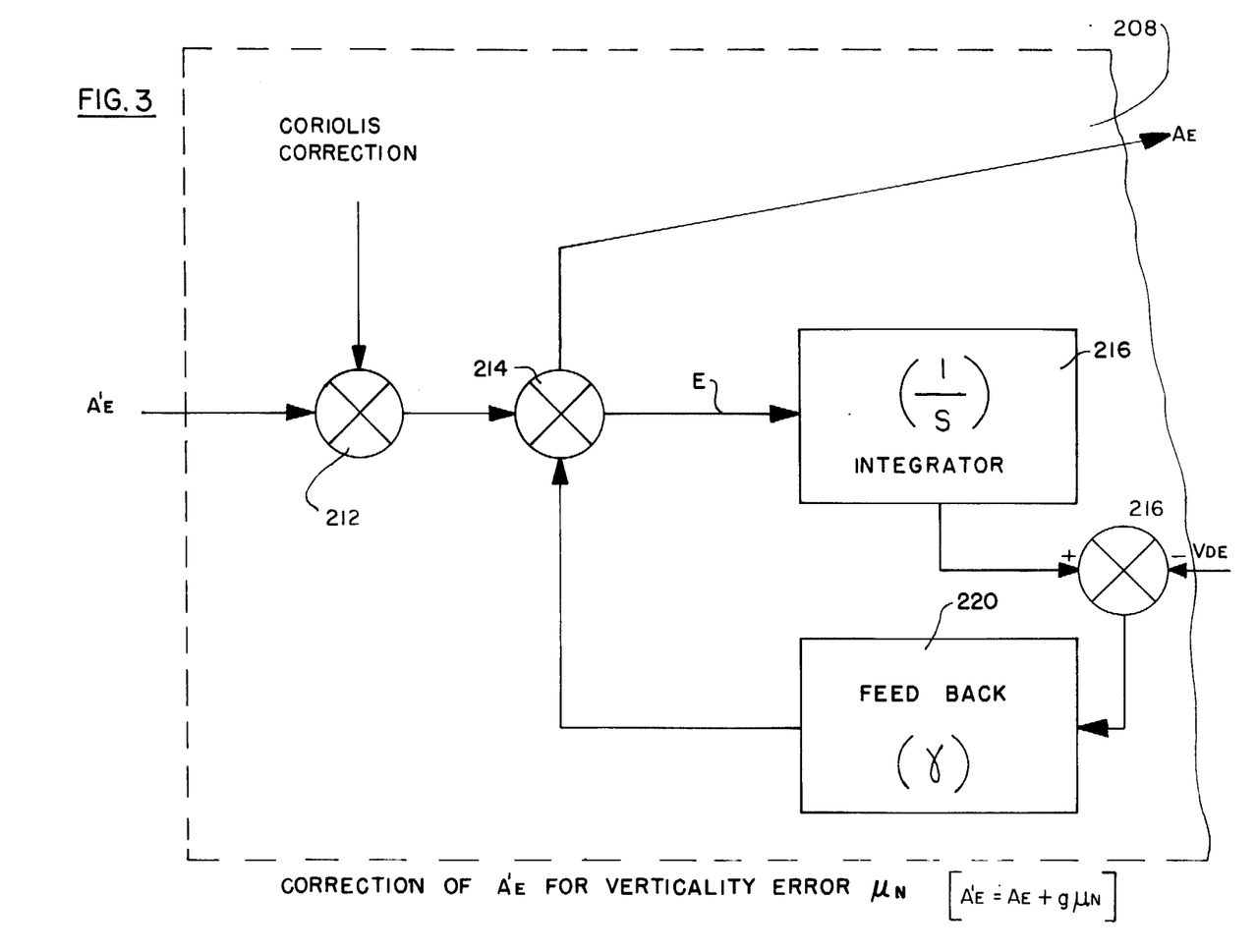
FIG. 3 is a block diagram of a portion of the system of the invention used to correct an inaccuracy in the system.

Correction of the East accelerometer output of the horizontal reference unit 50 for tilt about the North axis is achieved by use of a Doppler-inertial loop which is shown diagrammatically in FIG. 3. The output $A'_E$ of the East accelerometer is first corrected for Coriolis acceleration in a summing network 212, and the resulting signal is passed through a second summing network 214, and it is then integrated in an integrator 216 and compared with the Doppler East velocity in a comparator 218. The error velocity is fed back in a negative feedback manner through a feedback gain 220 to the summing network 214 at the input of the integrator to close the loop. The input E to the integrator is, in steady state, the true East acceleration, corrected for Coriolis and for vertical error about the North axis. From Fig. 3, the transform of E is found to be:

$$E(S) = \left[\frac{1}{1+\frac{\gamma}{S}}\right][A_E + g\mu_N] - \left[\frac{\gamma}{1+\frac{\gamma}{S}}\right][-V_{DE}] \quad (4)$$

Where:

[A + g $\mu_N$] is the East accelerometer output (corrected for Coriolis);
g is acceleration due to gravity;
$\mu_N$ is the vertical error about the North axis; and
$V_{DE}$ is the Doppler East velocity.
since $V_{DE} = A_E/s$, Equation (4) can be simplified to:

$$E(S) = A_E + (g\mu_N)\left[\frac{1}{1+\frac{\gamma}{S}}\right] \quad (5)$$

For a constant $\mu_N$, the steady state value of E(S) is simply $A_E$, the desired quantity.

The values $A_H$ and $A_D$ are the true vehicle reference accelerations against which $A'_H$ and $A'_D$ are compared to derive the pitch and roll errors ($\Delta P$ and $\Delta R$) errors in the vertical gyroscope 201.

In the absence of any gyro pitch and roll errors, the smoothed acceleration $A_H$ and $A_D$ should equal the smoothed accelerations $A'_H$ and $A'_D$ respectively. Therefore, subtraction of the corresponding signals in the apparatus 206 should result in information relative to the pitch and roll errors. If the indicated subtraction is performed, the result is found to be:

$$(A_H - A'_H) = -(\Delta R \sin P) A_D - (\Delta P) A_V \quad (6)$$

$$(A_D - A'_D) = (\Delta R \sin P) A_H - (\Delta R \cos P) A_V \quad (7)$$

In the above equations $A_H$, $A_D$ and $A_V$ are true horizontal drift, and vertical accelerations, and P is the true pitch of the aircraft. Since the vertical acceleration is composed of two components, the vertical acceleration plus the acceleration due to gravity, $A_V$ in Equations (6) and (7) can be replaced by $A_{VO} + g$. Thus we obtain:

$$(A_H - A'_H) = (-\Delta R \sin P) A_D - (\Delta P)(A_{VO} + g) \quad (8)$$

$$(A_D - A'_D) = (\Delta R \sin P) A_H + (\Delta R \cos P)(A_{VO} + g) \quad (9)$$

The solution of the foregoing equations using the pitch output of the vertical gyroscope 201 and vertical acceleration derived from the accelerometers 200 would be in error since the equations require the use of true pitch and vertical acceleration, neither of which is available. This can be overcome by using an iterative process in which the pitch angle and vertical accelerations are corrected by the computed corrections $\Delta P$ and $\Delta R$. The process is terminated when the computed values of $\Delta P$ and $\Delta R$ change by less than some specified amount.

The iterative process can be avoided by additional manipulation of the equations. It can be shown that the following identities hold:

$$A'_H \cos(P+\Delta P) - A'_V \sin(P+\Delta P) = A_H \cos P - A_V \sin P \quad (10)$$

$$A'_H \sin(P+\Delta P) + A'_V \cos(P+\Delta P) = A_H \sin P + A_V \cos P \quad (11)$$

Substituting Equation (11) into Equation (7) gives:

$$(A_D - A'_D) = \Delta R \sin(P+\Delta P) A'_H + \Delta A \cos(P+\Delta P) A'_V \quad (12)$$

Solving for $\Delta R$ from Equation (12) gives:

$$\Delta R = \frac{A_D - A'_D}{A'_H[\sin(P+\Delta P)] + A'_V[\cos(P+\Delta P)]} \quad (13)$$

$$= \frac{A_D - A'_D}{A'_H[\sin(P+\Delta P)] + (A_{VO} + g)'[\cos(P+\Delta P)]}$$

Equations (10) and (11) can be used to solve for the pitch error $\Delta P$, and the result is:

$$\Delta P = A_H - A'_H/A'_V = A_H - A'_H/(A_{VO} + g)' \quad (14)$$

Two important observations can be made with respect to the Equations (13) and (14), which are used to solve for the pitch and roll errors. First, it is significant that no vehicle accelerations are required in order that a solution be available. That is, $A_H$, $A_D$ and $A_V$ can all be zero, and it is still possible to solve for pitch and roll errors. In fact, the presence of additional vehicle accelerations serve to degrade the results since the accelerometer scale factor errors will contribute additional inaccuracies into the system. In addition, it will be noted that there is no requirement for a vertical accelerometer on the heading reference unit 50, since the required vertical acceleration information is derived from the accelerometer 200 at the swivelling gun station.

Figure 4:
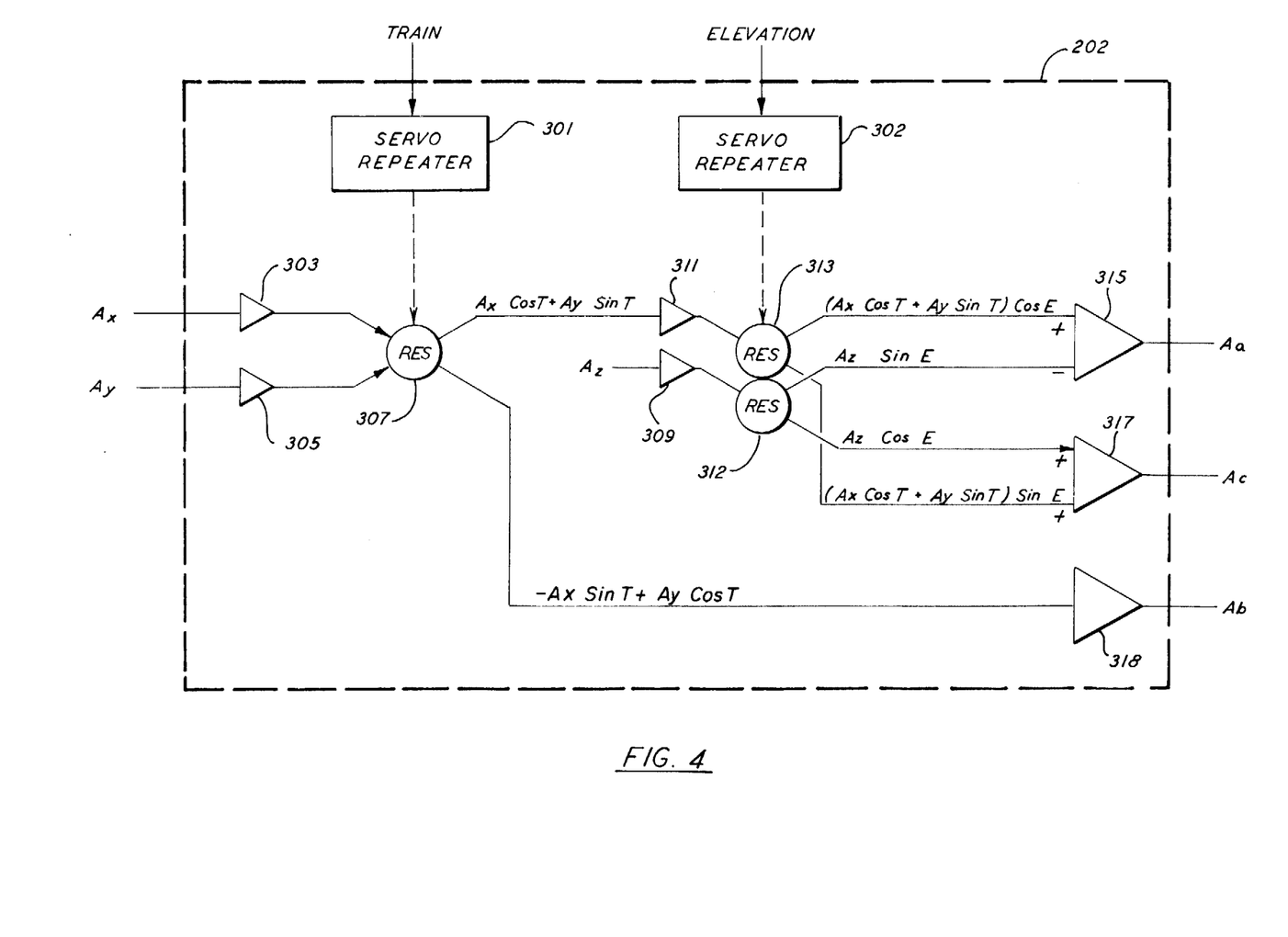
FIG. 4 is a schematic diagram of the implementation of a first coordinate transformation matrix.

The implementation of the blocks 202, 204, 210 and 206 is shown on FIGS. 4–7. As illustrated in FIG. 4, the train output of the vertical gyroscope 201 is provided to a servo repeater 301 which positions a resolver 307 to the train angle. The inputs $A_X$ and $A_Y$ are provided as inputs to the resolver through buffer amplifiers 303 and 305. The one output of the resolver 307 is coupled through an additional buffer into a further resolver 313 coupled to a servo repeater 302 responsive to the elevation input from the vertical gyro 201. The output of this resolver is provided as an input to the positive terminal of the summing amplifier 315. The second output is provided as a positive input to a summing amplifier 317. A second resolver 312 is coupled to the resolver 313 and obtains as its input the quantity $A_Z$ through a buffer amplifier 309. The respective outputs of this resolver are provided as a negative input to amplifier 315 and as a positive input to amplifier 317. At the outputs of amplifiers 315, 317 and 318 respectively are the quantities $A_A$, $A_C$ and $A_B$.

Figure 5:
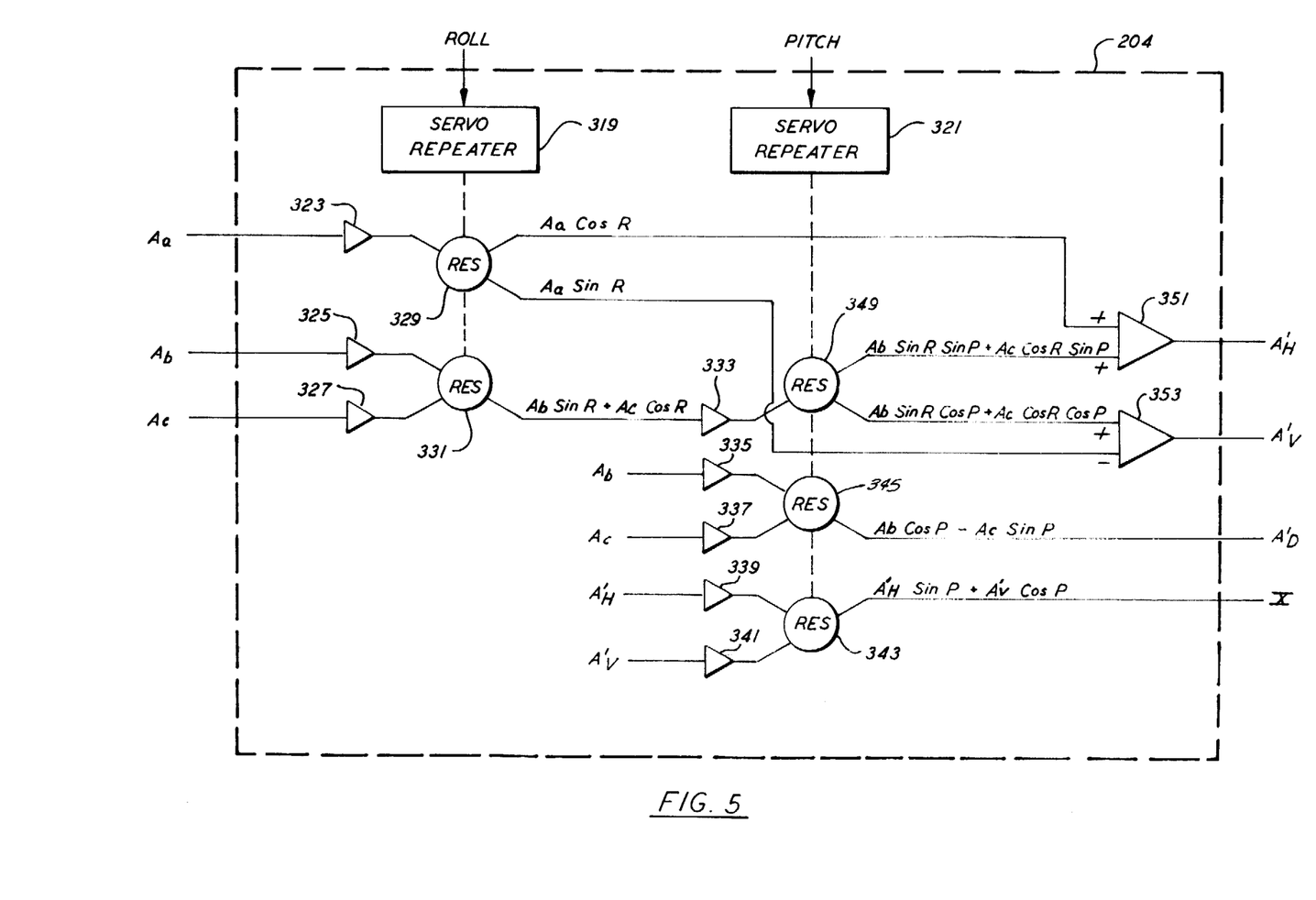
FIG. 5 is a schematic diagram of the implementation of a second coordinate transformation matrix.

The implementations of the coordinate transformation matrix 204 is illustrated on FIG. 5. The outputs $A_a$, $A_b$ and $A_C$ of the coordinate transformation matrix 202 are coupled through respective buffer amplifiers 323, 325 and 327. The output of amplifier 323 is the input to a resolver 329 driven by a servo repeater 319 responsive to the roll output of the vertical gyroscope 201. The other two values from amplifiers 325 and 327 are inputs to a resolver 331 which is coupled to the resolver 329. The first output of resolver 329 is provided as a positive input to a summing amplifier 351. The second output is a negative input to an amplifier 353. The output of resolver 331 is coupled through a buffer amplifier 333 to a resolver 349 driven by a servo repeater 321 responsive to the pitch output of the vertical gyroscope 201. The outputs of this resolver provide respectively an additional positive input to the amplifier 351 and a positive input to the amplifier 353. At the output of amplifier 351 is the quantity $A'_H$ and at the output of amplifier 353 a quantity $A'_V$. The quantities $A_b$ and $A_c$ are also coupled through buffer amplifiers 335 and 337 to a resolver 345 ganged to resolver 349. The output of of resolver 345 is the quantity $A'_D$. The quantities $A'_H$ and $A'_V$ are also coupled back through buffer amplifiers 339 and 341 to a resolver 343, also ganged to resolvers 345 and 349 to develop a signal designated as X to be used in a manner to be described below.

Figure 6:
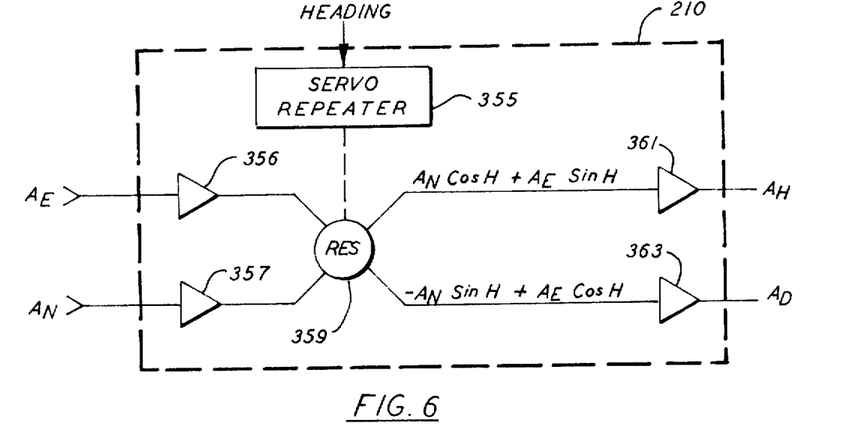
FIG. 6 is a schematic diagram of the implementation of a third coordinate transformation matrix.

The coordinate transformation matrix 210 is illustrated by FIG. 6. The inputs $A_E$ and $A_N$ are coupled through buffer amplifiers 356 and 357 to a resolver 359 driven by a servo repeater 355 responsive to a heading signal from the heading reference unit 50. Since this is a simple transformation the outputs of the resolver are the desired outputs and simply coupled through buffer amplifiers 361 and 363 to give the outputs $A_H$ and $A_D$.

Figure 7:
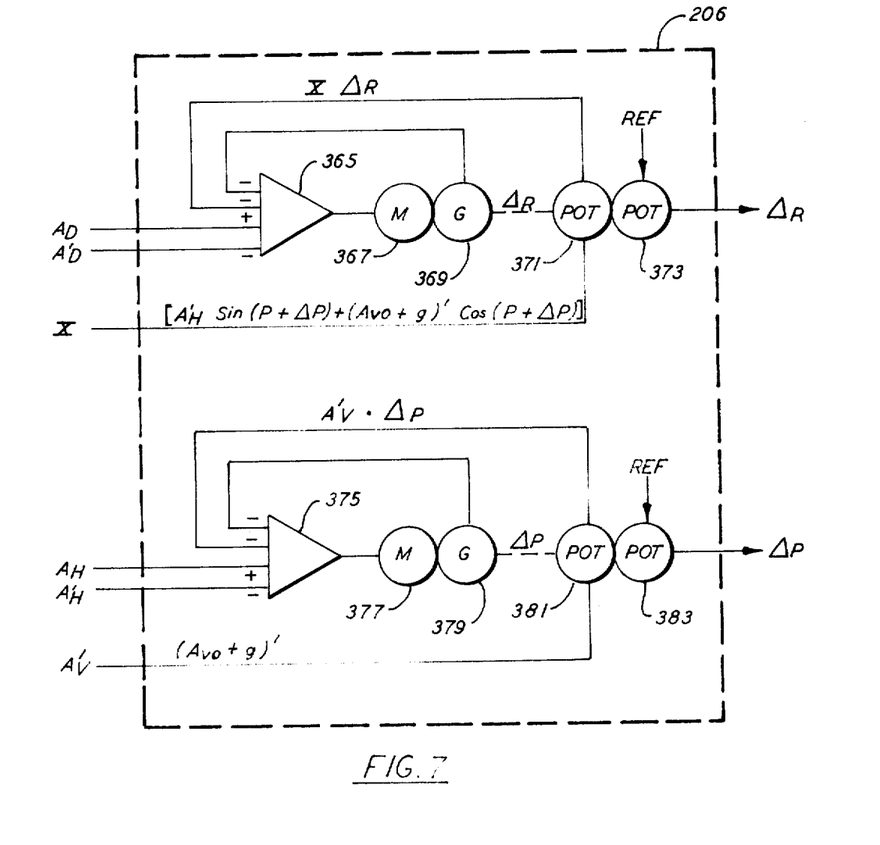
FIG. 7 is a schematic diagram of the implementation of the computing means of FIG. 2.

FIG. 7 illustrates the implementation of the computing apparatus 206. As illustrated, the quantities $A_D$ and $A'_D$ are provided as positive and negative inputs respectively to an amplifier 365 the output of which drives a motor 367. Velocity feedback to the amplifier is provided by a tachometer generator 369 mechanically coupled to the motor 367. Also coupled to the motor 367 is a potentiometer 371 having as an input the quantity X obtained from FIG. 5. This is the reference voltage for the potentiometer 371 and is fed back as negative position feedback to the amplifier 365. An additional potentiometer 373 is coupled to the same shaft having a reference input and providing as its output Δ R. The output Δ P is generated in similar fashion. The inputs $A_H$ and $A'_H$ are differenced at an amplifier 375 driving a motor 377 having coupled to its shaft the tachometer generator 379 providing negative feedback to the amplifier. Also coupled to the shaft 15 a potentiometer 381 obtaining as its reference input $A'_V$ and providing negative position feedback to the amplifier 375. Again, an additional potentiometer 383 is coupled to same shaft having a reference input and providing the output Δ P.

With respect to the difference between the equation for X on FIG. 5 and that used on FIG. 7, note that as described in the equation 14 $A'_V$ is equal to $A_{VO}$ plus G[']. Also note that since the quantities Δ R and Δ P are fed back from the computing means 206, the quantity P or pitch used in the servo repeater 321 will actually be the normal pitch P plus the pitch correction Δ P.

We claim:

1. A control system for use in an aircraft, or the like comprising:
    an inertial heading reference unit mounted on the aircraft and including accelerometer means and associated circuit means for providing first acceleration signals in horizontal coordinates;
    a controlled unit mounted on the aircraft remote from the inertial heading reference unit and including accelerometer means for producing second acceleration signals and vertical gyroscope means for producing pitch and roll signals;
    transforming circuit means coupled to said controlled unit and responsive to said second acceleration signals and controlled by said pitch and roll signals for transforming said second acceleration signals into second accelerations signals in horizontal coordinates; and
    computer means coupled to said heading reference unit and to said transforming circuit means for comparing the first and second acceleration signals in the horizontal coordinates to produce pitch and roll error signals to compensate for pitch and roll errors in said vertical gyroscope.

2. The system defined in claim 1 in which said transforming circuit means includes a train and elevation coordinate resolver and a coordinate pitch and roll resolver to obtain three components of acceleration in horizontal coordinates ($A'_H$, $A'_D$ and $A'_V$); and in which said circuitry associated with said heading reference unit transforms the outputs of the accelerometer means therein to obtain horizontal acceleration signals ($A_H$, $A_D$), and in which said computer means compares said acceleration signals ($A'_H$, $A'_D$) and ($A_H$, $A_D$) to produce said pitch and roll error signals.

3. The control system defined in claim 1 in which said inertial heading reference unit comprises a two-gimbal platform, and in which said associated circuitry includes circuitry to correct for tilt errors of the platform about the North axis.

4. The control system defined in claim 1 and which includes a stabilized platform mounted in the aircraft on which said inertial heading reference unit is mounted, and which includes a navigational doppler radar unit having an antenna element mounted on said platform.

* * * * *